United States Patent
Chen et al.

(10) Patent No.: US 9,268,205 B2
(45) Date of Patent: Feb. 23, 2016

(54) PROJECTOR AND METHOD OF ADJUSTING LUMINANCE BASED ON DETECTED VOLTAGE

(75) Inventors: Shun-Tai Chen, Hsin-Chu (TW); Chih-Neng Tseng, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 521 days.

(21) Appl. No.: 13/537,079

(22) Filed: Jun. 29, 2012

(65) Prior Publication Data

US 2013/0083299 A1 Apr. 4, 2013

(30) Foreign Application Priority Data

Sep. 30, 2011 (CN) .......................... 2011 1 0305211

(51) Int. Cl.
*G03B 21/14* (2006.01)
*G03B 21/20* (2006.01)
*H04N 9/31* (2006.01)

(52) U.S. Cl.
CPC .......... *G03B 21/2053* (2013.01); *H04N 9/3155* (2013.01); *H04N 9/3173* (2013.01); *G03B 21/14* (2013.01); *G03B 21/20* (2013.01)

(58) Field of Classification Search
CPC .... G03B 21/20; G03B 21/14; G03B 21/2053; H04N 9/3155; H04N 9/3173
See application file for complete search history.

(56) References Cited

U.S. PATENT DOCUMENTS

| | | | |
|---|---|---|---|
| 6,189,106 B1 * | 2/2001 | Anderson | 713/300 |
| 6,900,820 B2 * | 5/2005 | Kataoka et al. | 345/690 |
| 7,891,822 B2 * | 2/2011 | De Vaan | 353/85 |
| 7,901,084 B2 * | 3/2011 | Willey et al. | 353/49 |
| 7,938,548 B2 * | 5/2011 | Nozaki et al. | 353/119 |
| 8,690,354 B2 * | 4/2014 | Osaka et al. | 353/85 |
| 8,696,142 B2 * | 4/2014 | Osaka | G03B 17/54 353/119 |
| 2006/0002109 A1 * | 1/2006 | Imade | H04N 9/3114 362/231 |
| 2007/0195294 A1 * | 8/2007 | Willey | G03B 21/14 353/119 |
| 2007/0229772 A1 * | 10/2007 | De Vaan | G03B 21/14 353/43 |
| 2008/0179956 A1 * | 7/2008 | Jiang | H02J 9/061 307/66 |

(Continued)

FOREIGN PATENT DOCUMENTS

| | | |
|---|---|---|
| CN | 101621879 | 1/2010 |
| CN | 101770151 | 7/2010 |

(Continued)

OTHER PUBLICATIONS

"Office Action of China Counterpart Application", issued on Aug. 5, 2014, p. 1-p. 8, in which the listed references were cited.

*Primary Examiner* — Bao-Luan Le
(74) *Attorney, Agent, or Firm* — Jianq Chyun IP Office

(57) ABSTRACT

A projector and a light source controlling method thereof are provided. The light source controlling method includes the following steps. The light source module is controlled to adjust a luminance of a projection light generated by a light source module starting from a low luminance. A power source voltage from an electronic device is detected to be equal to a threshold voltage or not. A power of the power source voltage is detected to be equal to a threshold power or not. When the power source voltage is equal to the threshold voltage and the power of the power source voltage is less than or equal to the threshold power, or when the power source voltage is greater than or equal to the threshold voltage and the power of the power source voltage is equal to the threshold power, the adjustment of the luminance of the projection light is stopped.

10 Claims, 2 Drawing Sheets

(56) References Cited

U.S. PATENT DOCUMENTS

| | | |
|---|---|---|
| 2008/0231816 A1 | 9/2008 | Tanaka |
| 2009/0033888 A1* | 2/2009 | Nozaki et al. ............... 353/119 |
| 2009/0141245 A1* | 6/2009 | Nozaki et al. ............... 353/56 |
| 2010/0060618 A1* | 3/2010 | Okuda et al. ............... 345/204 |
| 2011/0300904 A1* | 12/2011 | Osaka .................. G03B 17/54 455/556.1 |
| 2011/0304833 A1* | 12/2011 | Osaka .................. G03B 21/00 353/85 |
| 2011/0304834 A1* | 12/2011 | Osaka .................. G03B 17/54 353/85 |

FOREIGN PATENT DOCUMENTS

| | | |
|---|---|---|
| CN | 102023462 | 4/2011 |
| CN | 102053463 | 5/2011 |
| JP | 5196317 | 5/2013 |
| TW | I307808 | 3/2009 |
| TW | M357153 | 5/2009 |

* cited by examiner

PROJECTOR AND METHOD OF ADJUSTING LUMINANCE BASED ON DETECTED VOLTAGE

CROSS-REFERENCE TO RELATED APPLICATION

This application claims the priority benefit of China application serial no. 201110305211.2, filed on Sep. 30, 2011. The entirety of the above-mentioned patent application is hereby incorporated by reference herein and made a part of this specification.

BACKGROUND OF THE INVENTION

1. Field of the Invention

The invention relates to an optical device and a light source controlling method thereof, in particular, to a projector and a light source controlling method thereof.

2. Description of Related Art

A projection device can project an image onto a large screen for the convenience of viewing by lots of people at the same time, so the projection device is commonly applied in public places like companies or schools. Moreover, in the development trend of the large scale of the home display products, the projection device is gradually popularized in common families and becomes an electronic product that is commonly seen in modern lives.

Along with the progress of technology, the portable micro projector (pico projector, or referred to as mini projector) has gradually become the mainstream for the future personal digital market. Generally speaking, a light source of the micro projector adopts a light emitting diode (LED) or another solid-state light source. When the micro projector is connected to the electronic device, the voltage provided by the electronic device serves as the operating voltage of the micro projector.

However, since the micro projector has to use the voltage of the electronic device, the stability of the internal voltage of the electronic device is influenced when the micro projector is connected to the electronic device. When the power of the voltage provided by the electronic device is relatively low, the abnormal running or even the auto shutdown of the electronic device may be caused when the micro projector is connected to the electronic device. In the situation of the abnormal running and the auto shutdown, the components of the electronic device are exposed to the risk of damages.

Taiwan Grant Patent No. 1307808 has disclosed a projection device, in which a connector of a power source circuit system is electrically connected to a USB connector of a computer by a USB cable, so that the computer provides a power source for the projection device. A casing of the projection device encapsulates a projection module, a driving module and the power source circuit system of the projection device and exposes some connectors of the power source circuit system.

Taiwan Grant Utility Model Patent No. M357153 has disclosed a projection device, which receives a power source and signal sent by a computer through a USB interface and a USB cable. The USB interface of the projection device may be connected to at least one USB interface of the computer, so as to receive the power source through the connected USB interface and receive the signal through one of the connected USB interface. The voltage of the power source received by the projection device is changed by a voltage control module and then transferred to a switching module. The switching module transfers the changed voltage to an image display module. The driving module of the projection device adjusts the current received by the USB interface from the computer and transfers the adjusted current to the image display module to change the display brightness of the image display module.

SUMMARY OF THE INVENTION

The invention is directed to a projector and a light source controlling method thereof, and the projector and the light source controlling method thereof may alleviate the influence on an internal voltage of an electronic device when the projector is electrically connected to the electronic device, so as to prevent abnormal running or auto shutdown of the electronic device caused by the unstable internal voltage and further protect internal components of the electronic device from damages.

The objectives and advantages of the invention may be further understood from the technical features disclosed in the invention.

To achieve one, some or all of the above objectives or other objectives, in an embodiment of the invention, a projector electrically connected to an electronic device is provided. The projector includes a detection unit, a projection unit, a light source module, and a control unit. The detection unit detects whether a power source voltage from the electronic device is equal to the threshold voltage and detects whether a power of the power source voltage is equal to a threshold power, and outputs a detection result. The projection unit receives an image data and a projection light to project an image. The light source module provides the projection light. The control unit is electrically connected to the detection unit, the projection unit, and the light source module. The control unit receives an image signal from the electronic device and generates the image data received by the projection unit, and controls the light source module to adjust a luminance of the projection light starting from a low luminance. When the detection result shows that the power source voltage is equal to the threshold voltage and the power of the power source voltage is less than or equal to the threshold power, or when the detection result shows that the power source voltage is greater than or equal to the threshold voltage and the power of the power source voltage is equal to the threshold power, the adjustment of the luminance of the projection light is stopped.

In another embodiment of the invention, a light source controlling method of a projector is provided. The projector includes a light source module. The light source controlling method includes the following steps. The light source module is controlled to adjust a luminance of a projection light generated by the light source module starting from a low luminance. A power source voltage from an electronic device is detected to be equal to a threshold voltage or not. A power of the power source voltage is detected to be equal to the threshold power or not. When the power source voltage is equal to the threshold voltage and the power of the power source voltage is less than or equal to the threshold power, or when the power source voltage is greater than or equal to the threshold voltage and the power of the power source voltage is equal to the threshold power, the adjustment of the luminance of the projection light is stopped.

In view of the above, in the projector and the light source controlling method thereof according to an embodiment of the invention, the light source module adjusts the luminance of the projection light starting from the low luminance, which may reduce the influence on the internal voltage of the electronic device when the projector is connected to the electronic device to the lowest level, so as to prevent the abnormal running or auto shutdown of the electronic device caused by the unstable internal voltage and further protect internal components of the electronic device from damages.

Other objectives, features and advantages of the invention will be further understood from the further technological features disclosed by the embodiments of the invention wherein there are shown and described preferred embodiments of the invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
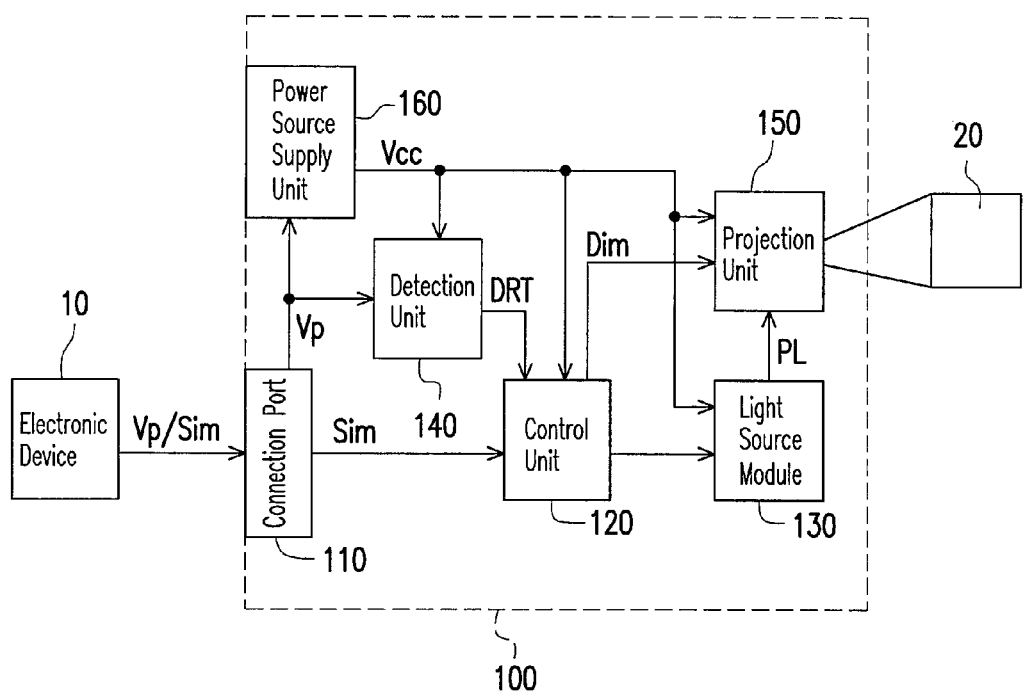
FIG. 1 is a systematic schematic view of a projector electrically connected to an electronic device according to an embodiment of the invention.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the embodiment, the projector 100 includes a connection port 110, a control unit 120, a light source module 130, a detection unit 140, a projection unit 150, and a power source supply unit 160. The connection port 110 is used to connect an electronic device 10, so as to receive a power source voltage Vp and an image signal Sim from the electronic device 10. The connection port 110 may be a Universal Serial Bus (USB) port so as to be electrically connected to at least one USB port of the electronic device 10. The electronic device 10 may be the electronic device with an audio-visual playback function, for example, a video player or a computer device.

The detection unit 140 is electrically connected to the connection port 110, for detecting whether the power source voltage Vp from the electronic device 10 is equal to a threshold voltage, and detecting whether a power of the power source voltage Vp is equal to the threshold power, and outputting a detection result DRT. The power source voltage Vp may be directly measured, and the power of the power source voltage Vp may be obtained by calculating the measured power source voltage Vp and the measured current. An analog-to-digital converter (ADC) is configured in the detection unit 140, for converting the detected voltage and current into digital data for the convenience of calculation and comparison.

The power source voltage Vp of the electronic device 10 decreases depending on the increasing of the luminance output by the light source module 130 of the projector 100. In the embodiment of the invention, the threshold voltage is set to be 0.9 times a standard value of the power source voltage Vp, and the threshold power is set to be twice as big as a rated power of a single USB port. Furthermore, if the connection port 110 is the connection port conforming to the USB 2.0, for example, since the USB 2.0 specifies the rated output voltage (i.e. the standard value of the power source voltage Vp) of the connection port is 5 V and the rated output current is 700 mA, the threshold voltage may be 4.5 V (i.e. 5 V×0.9), the rated power of the connection port 110 is 3.5 W (i.e. 5 V×700 mA), the threshold power may be 7 W (i.e. 2×3.5 W). If the connection port 110 is the connection port conforming to the USB 3.0, since the USB 3.0 specifies the rated output voltage of the connection port is 5 V and the rated output current is 900 mA, the threshold voltage may be 4.5 V (i.e. 5×0.9 V), the rated power of the connection port 110 is 4.5 W (i.e. 5×900 mA), the threshold power may be 9 W (i.e. 2×4.5 W). However, the threshold voltage and the threshold power may be determined according to the actual electrical characteristics of the connection port of the electronic device 10 connected to the connection port 110, and is not limited to the embodiment of the invention.

The control unit 120 is electrically connected to the connection port 110, the detection unit 140, and the light source module 130. The control unit 120 receives the image signal Sim from the electronic device 10 and generates an image data Dim according to the image signal Sim. The control unit 120 controls the light source module 130 to provide a projection light PL, and controls the light source module 130 to adjust the luminance of the projection light PL starting from the low luminance. A light-emitting component (e.g. Light Emitting Diode, LED) may be configured in the light source module 130 to generate the projection light PL. The aforementioned low luminance may be the minimum luminance of the projection light PL generated by the light source module 130, or the aforementioned low luminance may be a lumen of the lowest start luminance of the LED, for example, 3-5 lumens for a red LED, 19-20 lumens for a green LED, and 0.5-0.7 lumens for a blue LED. In an exemplary embodiment, the red LED is 3.7 lumens, the green LED is 19.4 lumens, and the blue LED is 0.6 lumens, but the invention is not limited to this abovementioned.

The projection unit 150 is electrically connected to the control unit 120, for receiving the image data Dim and the projection light PL to project an image 20. The power source supply unit 160 is electrically connected to the connection port 110, the control unit 120, the light source module 130, the detection unit 140, and the projection unit 150, for receiving the power source voltage Vp to generate a operating voltage Vcc required by the control unit 120, the light source module 130, the detection unit 140, and the projection unit 150 while running. The operating voltage Vcc may be provided to the control unit 120, the light source module 130, the detection unit 140, and the projection unit 150.

The control unit 120 may control the light source module 130 to adjust the luminance of the projection light PL according to the detection result DRT. In details, when the detection result DRT shows that the power source voltage Vp is greater than the threshold voltage and the power of the power source voltage Vp is less than the threshold power, the control unit 120 controls the light source module 130 to increase the luminance of the projection light PL. When the detection result DRT shows that the power source voltage Vp is greater than the threshold voltage and the power of the power source voltage Vp is greater than the threshold power, the control unit 120 controls the light source module 130 to reduce the luminance of the projection light PL. When the detection result DRT shows that the power source voltage Vp is less than the threshold voltage and the power of the power source voltage Vp is less than the threshold power, the control unit 120 controls the light source module 130 to reduce the luminance of the projection light PL. When the detection result DRT shows that the power source voltage Vp is less than the threshold voltage and the power of the power source voltage Vp is greater than the threshold power, the control unit 120 controls the light source module 130 to reduce the luminance of the projection light PL.

When the detection result DRT shows that the power source voltage Vp is equal to the threshold voltage and the power of the power source voltage Vp is less than or equal to the threshold power or the power source voltage Vp is greater than or equal to the threshold voltage and the power of the power source voltage Vp is equal to the threshold power, the control unit 120 controls the light source module 130 to stop the adjustment of the luminance of the projection light PL.

Generally speaking, the high power consumption part of the projector 100 is the light source module 130 that provides the projection light PL. In the embodiment, since the light source module 130 adjusts the luminance of the projection light PL starting from the low luminance, when the projector 100 is connected to the electronic device 10 and extracts the power source voltage Vp of the electronic device 10, the influence on the internal voltage of the electronic device 10 may be reduced to the lowest level, so as to prevent the abnormal running or even the auto shutdown of the electronic device 10 caused by the unstable internal voltage and further protect the components in the electronic device 10 from damages. The control unit 120 adjusts the power consumption of the projector 100 by means of adjusting the luminance of the projection light PL, and determines whether the power consumption of the projector 100 causes an excessive loading on the electronic device 10 by means of detecting whether the power source voltage Vp is equal to the threshold voltage and detecting whether the power of the power source voltage Vp is equal to the threshold power. In the manner, the power consumption of the projector 100 is adjusted to an appropriate range.

Figure 2:
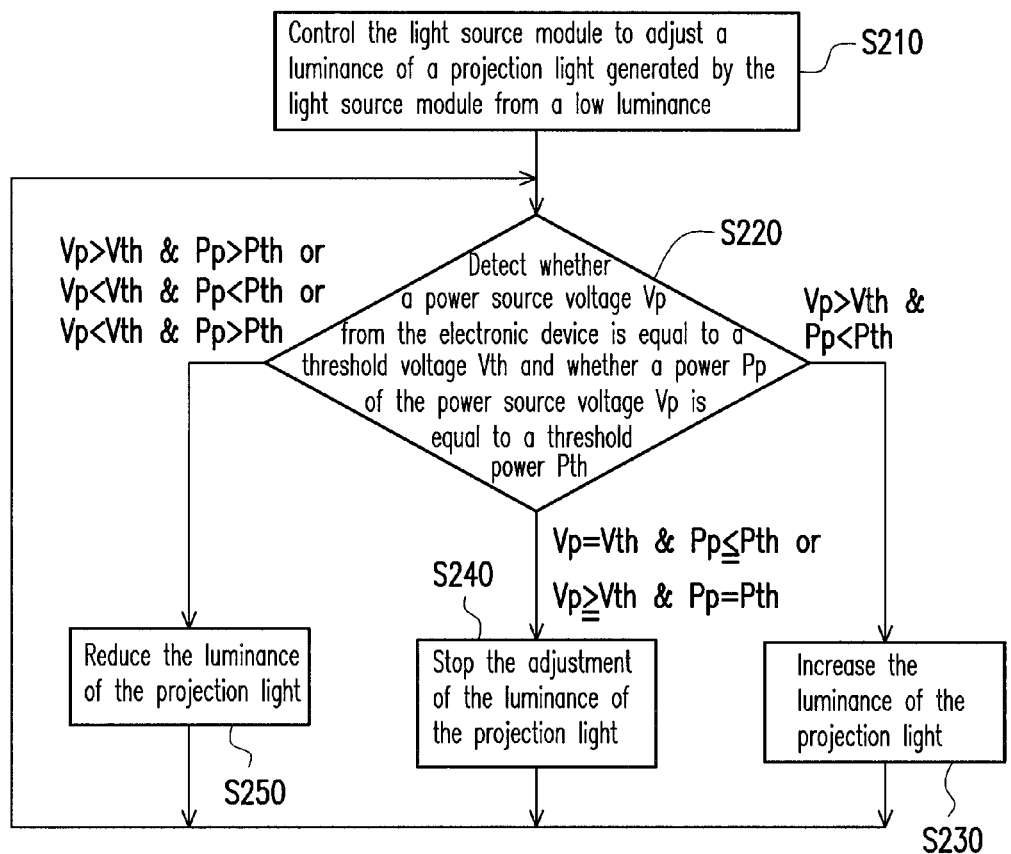
FIG. 2 is a flow chart of a light source controlling method of a projector according to an embodiment of the invention.

According to the above description, a light source controlling method of a projector may be provided, which is applicable to the projector 100. Referring to FIG. 2, in the embodiment, the projector includes a light source module. Firstly, the light source module is controlled to adjust a luminance of a projection light generated by the light source module from a low luminance (step S210). Subsequently, a power source voltage from the electronic device Vp is detected to be equal to a threshold voltage Vth or not and a power Pp of the power source voltage Vp is detected to be equal to a threshold power Pth or not (step S220). When the power source voltage Vp is greater than the threshold voltage Vth and the power Pp of the power source voltage Vp is less than the threshold power Pth, the luminance of the projection light is increased (step S230).

When the power source voltage Vp is equal to the threshold voltage Vth and the power Pp of the power source voltage Vp is less than or equal to the threshold power Pth, or when the power source voltage Vp is greater than or equal to the threshold voltage Vth and the power Pp of the power source voltage Vp is equal to the threshold power Pth, the adjustment of the luminance of the projection light is stopped (step S240). When the power source voltage Vp is greater than the threshold voltage Vth and the power Pp of the power source voltage Vp is greater than the threshold power Pth, when power source voltage Vp is less than the threshold voltage Vth and the power Pp of the power source voltage Vp is less than the threshold power Pth, or the power source voltage Vp is less than the threshold voltage Vth and the power Pp of the power source voltage Vp is greater than the threshold power Pth, the luminance of the projection light is reduced (step S250). After the steps S230, S240, and S250 are finished, the process returns to the step S220 to detect whether the adjusted power source voltage Vp and adjusted the power Pp of the power source voltage Vp falls in the appropriate range or the power source voltage Vp and whether the power Pp of the power source voltage Vp is maintained in the appropriate range. The details of the above steps may refer to the abovementioned relevant descriptions and FIG. 1, so the details will not be repeated herein.

In view of the above, in the projector and the light source controlling method thereof according to an embodiment of the invention, the light source module adjusts the luminance of the projection light from the low luminance, which may reduce the influence on the internal voltage of the electronic device when the projector is connected to the electronic device and extracts the power source voltage of the electronic device to the lowest level, so as to prevent the abnormal running or even the auto shutdown of the electronic device caused by the unstable internal voltage and further protect the internal components of the electronic device from damages. The control unit adjusts the power consumption of the projector by means of adjusting the luminance of the projection light and determines whether the power consumption of the projector causes an excessive loading on the electronic device by means of detecting whether the power source voltage is equal to the threshold voltage and detecting whether the power of the power source voltage is equal to the threshold power. In the manner, the power consumption of the projector is adjusted to an appropriate range.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector adapted to electrically connect to an electronic device with an audio-visual playback function, the projector comprising:
   a detection unit, for detecting whether a power source voltage from the electronic device is equal to a threshold voltage, detecting whether a power of the power source voltage is equal to a threshold power, and outputting a detection result, based on the power source voltage and the power of the power source voltage, during the projector operation;
   a light source module, for providing a projection light;
   a projection unit, for receiving an image data and the projection light to project an image; and
   a control unit, electrically connected to the detection unit, the projection unit and the light source module, for receiving an image signal from the electronic device and generating the image data received by the projection unit, wherein when the projector is electrically connected to the electronic device, the control unit is configured to control the light source module to gradually adjust a luminance of the projection light starting from a low luminance, wherein the low luminance is a minimum luminance of the projection light generated by the light source module, and adjust the luminance of the projection based on the detection result, and wherein the control unit stops the adjustment of the luminance of the projection light when the detection result shows that the power source voltage is equal to the threshold voltage and the power of the power source voltage is less than or equal to the threshold power, or when the detection result shows that the power source voltage is greater than or equal to the threshold voltage and the power of the power source voltage is equal to the threshold power.

2. The projector according to claim 1, wherein when the power source voltage is greater than the threshold voltage and the power of the power source voltage is less than the threshold power, the control unit controls the light source module to increase the luminance of the projection light; when the power source voltage is greater than the threshold voltage and the power of the power source voltage is greater than the threshold power, the control unit controls the light source module to reduce the luminance of the projection light; when the power source voltage is less than the threshold voltage and the power of the power source voltage is less than the threshold power, the control unit controls the light source module to reduce the luminance of the projection light; and when the power source voltage is less than the threshold voltage and the power of the power source voltage is greater than the threshold power, the control unit controls the light source module to reduce the luminance of the projection light.

3. The projector according to claim 1, further comprising a power source supply unit electrically connected to the detection unit, the projection unit, the light source module, and the control unit, for receiving the power source voltage generated an operating voltage, wherein the operating voltage is provided to the detection unit, the projection unit, the light source module, and the control unit.

4. The projector according to claim 1, wherein the threshold voltage is 0.9 times a standard value of the power source voltage.

5. The projector according to claim 1, wherein the projector is electrically connected to at least one Universal Serial Bus port of the electronic device.

6. The projector according to claim 5, wherein the threshold power is two times a rated power of a single Universal Serial Bus port.

7. A light source controlling method of a projector adapted to electrically connect to an electronic device with an audio-visual playback function, wherein the projector comprises a light source module, the light source controlling method comprising:
   controlling the light source module to gradually adjust a luminance of a projection light generated by the light source module starting from a low luminance, wherein the low luminance is defined as a minimum luminance of the projection light generated by the light source module;
   detecting whether a power source voltage from the electronic device is equal to a threshold voltage;
   detecting whether a power of the power source voltage is equal to a threshold power; and
   stopping the adjustment of the luminance of the projection light when the power source voltage is equal to the threshold voltage and the power of the power source voltage is less than or equal to the threshold power, or when the power source voltage is greater than or equal to the threshold voltage and the power of the power source voltage is equal to the threshold power.

8. The light source controlling method of the projector according to claim 7, wherein the step of adjusting the luminance of the projection light generated by the light source module comprises:
   increasing the luminance of the projection light when the power source voltage is greater than the threshold voltage and the power of the power source voltage is less than the threshold power;
   reducing the luminance of the projection light when the power source voltage is greater than the threshold voltage and the power of the power source voltage is greater than the threshold power;
   reducing the luminance of the projection light when the power source voltage is less than the threshold voltage and the power of the power source voltage is less than the threshold power; and
   reducing the luminance of the projection light when the power source voltage is less than the threshold voltage and the power of the power source voltage is greater than the threshold power.

9. The light source controlling method of the projector according to claim 7, wherein the threshold voltage is 0.9 times a standard value of the power source voltage.

10. The light source controlling method of the projector according to claim 7, wherein the threshold power is twice a rated power of a Universal Serial Bus port.

* * * * *